United States Patent [19]

Nakane

[11] Patent Number: 5,067,128
[45] Date of Patent: Nov. 19, 1991

[54] RECORDED DATA READING SYSTEM

[75] Inventor: Hiroshi Nakane, Kanagawa, Japan

[73] Assignee: Kabushiki Kaisha Toshiba, Kanagawa, Japan

[21] Appl. No.: 411,389

[22] Filed: Sep. 22, 1989

[30] Foreign Application Priority Data

Sep. 30, 1988 [JP] Japan .................................. 63-243829

[51] Int. Cl.$^5$ ............................................. G06F 11/00
[52] U.S. Cl. ....................................... 371/5.5; 371/5.1
[58] Field of Search ................. 371/5.5, 5.4, 5.1, 40.1, 371/51.1; 360/51, 45, 53; 369/53, 54, 60

[56] References Cited

U.S. PATENT DOCUMENTS

| | | | |
|---|---|---|---|
| 4,414,668 | 11/1983 | Iwasaki | 371/5.5 |
| 4,672,482 | 6/1987 | Troletti | 360/51 X |
| 4,672,483 | 6/1987 | Kawada | 360/43 X |
| 4,710,925 | 12/1987 | Negi | 371/5.5 |
| 4,726,022 | 2/1988 | Chan | 360/51 X |
| 4,748,625 | 5/1988 | Krause | 371/5.5 |
| 4,809,088 | 2/1989 | Lofgren | 360/45 X |
| 4,896,337 | 1/1990 | Bushy | 360/51 X |
| 4,908,811 | 3/1990 | Yokogawa | 360/53 X |

FOREIGN PATENT DOCUMENTS 300732 1/1989 European Pat. Off. .
306151 3/1989 European Pat. Off. .
238194 9/1989 European Pat. Off. .

Primary Examiner—Robert W. Beausoliel
Attorney, Agent, or Firm—Finnegan, Henderson, Farabow, Garrett and Dunner

[57] ABSTRACT

An apparatus for reading data stored on a data storage medium. The apparatus includes a data readout device for reproducing data stored on the data storage medium, an error detector coupled to the data readout device for detecting an error rate at which errors occur in the data reproduced by the data readout device, a readout controller for operating the data readout device at a selected data readout rate and a system controller coupled to the error detector and the readout controller for comparing the error rate to a predetermined system maximum error rate and for establishing the selected data readout rate such that the error rate is below the predetermined system maximum error rate.

24 Claims, 4 Drawing Sheets

FIG. 1.

RECORDED DATA READING SYSTEM

FIELD OF THE INVENTION

The present invention relates generally to a recorded data reading system, and more particularly, to a recorded data reading system suitable for reading data at as high a speed as possible.

BACKGROUND OF THE INVENTION

In recent years, magnetic discs such as floppy discs and optical discs such as CD-ROMS have been used as external data record media of computers and data processors. These external data record media store information in the form of digital data.

The digital data recorded on these external data record media are read by prescribed data readers such as magnetic disc driver and CD-ROM driver. Then the data read from the media are applied to the computers or the data processors.

In the conventional recorded data reading system, the data are read at a rated speed defined by each of the record media or the data readers. This is done so that the data can be read at or below a predetermined error rate.

The rated data reading speeds are determined by reflecting an irregularity of data reading accuracy of respective data readers, caused, for example, by a fluctuation of temperature and/or a deterioration of the record media over time.

Thus, in the conventional data reading systems, there is a drawback that the data can not be read at a speed higher than the rated speed provided for the respective system, even when an individual system has a high reading accuracy. Furthermore, there is a serious drawback that the data can not be read accurately at the rated speed if the individual system is seriously deteriorated.

SUMMARY OF THE INVENTION

It is an object of the present invention to provide a recorded data reading system in which an individual system is able to read data from record media at a speed specified in response to a data reading accuracy established in the individual system.

Another object of the present invention is to provide a recorded data reading system in which an individual system is able to read data from record media at a speed higher than a rated speed provided for the system, when the individual system has a high reading accuracy.

A further object of the present invention is to provide a recorded data reading system in which an individual system is able to read data from record media at a speed lower than a rated speed provided for the system, when the individual system has a low reading accuracy.

In order to achieve the above object, a data readout apparatus includes a data readout device for reproducing data stored on the data storage medium, an error detecter coupled to the data readout device for detecting an error rate at which errors occur in the data reproduced by the data readout device, a readout controller for operating the data readout device at a selected data readout rate and a system controller coupled to the error detecter and the readout controller for comparing the error rate to a predetermined system maximum error rate and for establishing the selected data readout rate such that the error rate is below the predetermined system maximum error rate.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
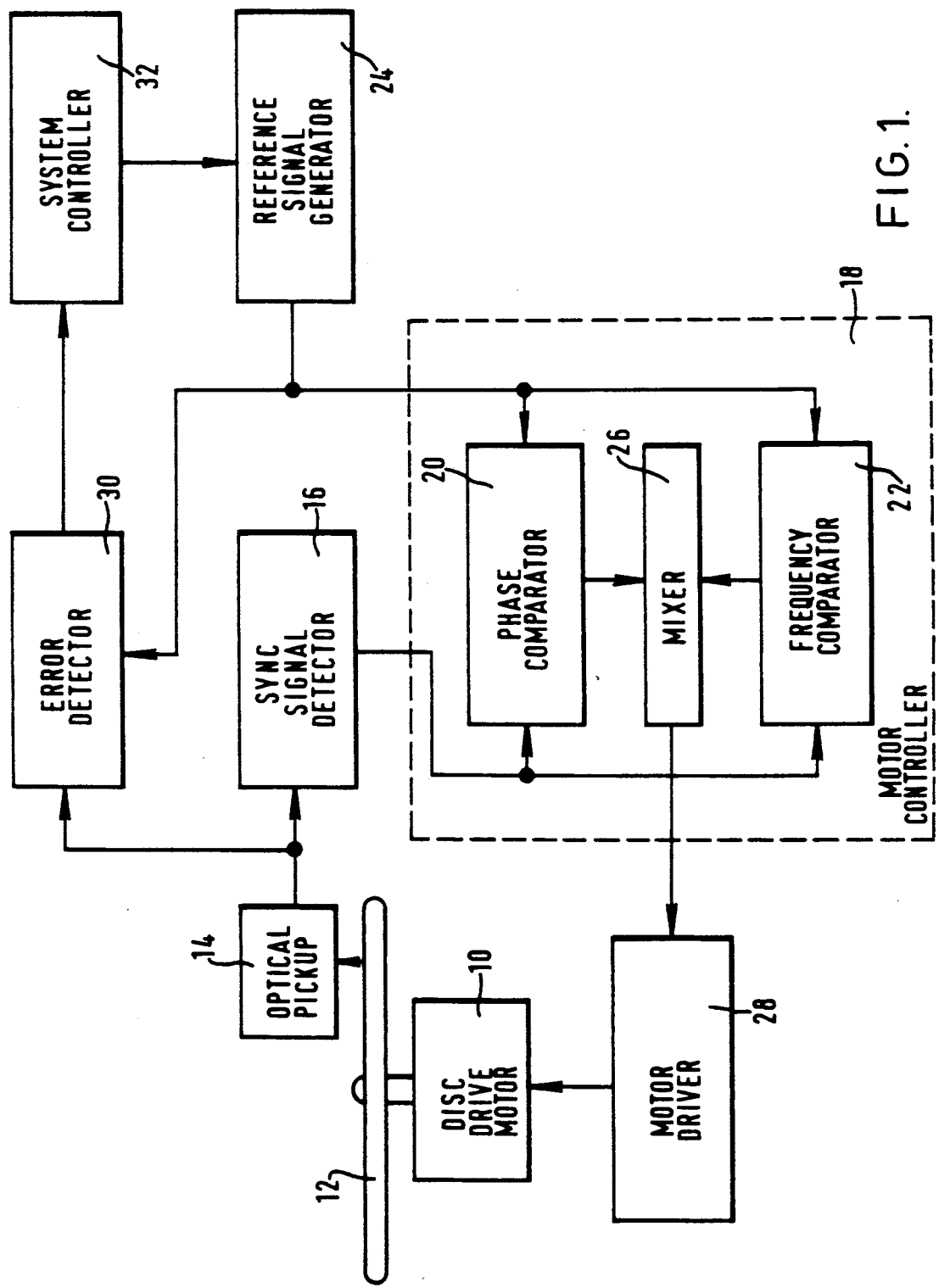
FIG. 1 is a block diagram showing a recorded data reader, which constitutes a first embodiment of the present invention.

The present invention will be described in detail with reference to the FIGS. 1 through 4. Throughout the drawings, like or equivalent reference numerals or letters will be used to designate like or equivalent elements for simplicity of explanation.

In the following description, the recorded data reading system according to the present invention is embodied in CD-ROM readers.

Referring now to FIG. 1, a first embodiment of the present invention will be described in detail.

In FIG. 1, a disc drive motor 10 is provided for rotating a CD-ROM 12. When the disc drive motor 10 rotates the CD-ROM 12, an optical pickup 14 reads data recorded on CD-ROM 12. At the beginning of the data reading operation, a data reading speed is set to a rated data reading speed defined by general specifications of the system. During the data reading operation at the rated speed, the data read by the optical pickup 14 is applied to a sync signal detector 16. The sync signal detector 16 detects a sync signal from the read data. The sync signal is supplied to a motor controller 18. The motor controller 18 includes a phase comparator 20 and a frequency comparator 22. The phase comparator 20 compares the phase of the sync signal with the phase of a reference signal supplied from a reference signal generator 24. The frequency comparator 22 compares the frequency of the sync signal with the frequency of the reference signal.

The frequency of the reference signal is set at a frequency corresponding to the rated data reading speed of CD-ROM 12. Phase difference and frequency difference of the sync signal compared with this reference signal are given to the control terminals of a motor driving circuit 28 by opening the mixer 26. As a result, rotation of the disc drive motor 10 is servo controlled so that phase and frequency of the sync signal extracted from the regenerated signal of CD-ROM 12 agree with those of the reference signal.

Data read at the rated data reading speed at the beginning stage are supplied to the error detector 30 through the optical pickup 14. The error detector 30 performs the error detection using a reference signal given from the reference signal generator 24 as a master clock signal. Errors or an error rate detected by the error detector 30 are given to the system controller 32 consisting of, for instance, a microcomputer. In the system controller 32, the maximum error rate allowable to this system has been set and is compared with the error rate detected by the error detector 30.

If the detected error rate is smaller than the maximum error value, the system controller 32 controls the reference signal generator 24 and increases frequency of the reference signal. As a result, the rotating speed of the disc drive motor 10 is increased and the data reading speed of CD-ROM is also increased.

Errors in the data read at this new data reading speed are checked by the error detector 30 in the same manner as described above. The error rate thus detected is compared with the maximum error rate that is set in the system controller 32.

As described above, if the detected error rate is smaller than the maximum error rate, frequency of the reference signal is made accordingly higher, such that the data reading speed of CD-ROM is increased. Similarly, when the detected error values become equal to or greater than the maximum error rate or more, the system controller 32 controls the reference signal generator 24 to lower the frequency of the reference signal by a fixed value, and keeps that lower frequency.

If the error rate of data read at the rated data reading speed at the beginning of the operation is larger than the maximum error rate, the system controller 32 lowers frequency of the reference signal. As a result of this lowering of the reference signal frequency, the reading speed of CD-ROM 12 is lowered and the error rate of data read by the optical pickup 14 is lowered. When the error rate becomes almost equal to the maximum error rate, the system controller 32 controls the reference signal generator 24 to further lower the reference signal frequency by a fixed value and keeps that frequency state as described above.

Thus, the learning operation to set up a data reading speed as high as possible to secure an error rate less than the maximum error rate is completed. Thereafter, the recorded data reading operation of CD-ROM is carried out at the reading rate that has been set up in the learning operation.

The invention thus includes data readout means for reproducing data stored on the data storage medium, error detection means coupled to the data readout means for detecting an error rate at which errors occur in the data reproduced by the data readout means, readout control means for operating the data readout means at a selected data readout rate and system control means coupled to the error detection means and the readout control means for comparing the error rate to a predetermined system maximum error rate and for establishing the selected data readout rate such that the error rate is below the predetermined system maximum error rate. As embodied herein, the data readout means comprises the optical pickup 14. The error detection means comprises the error detector 30. The readout control means comprises the sync signal detector 16, the motor controller 18, the motor driver 28 and the disc drive motor 10. The system control means comprises the system controller 32 and the reference signal generator 24.

Figure 2:
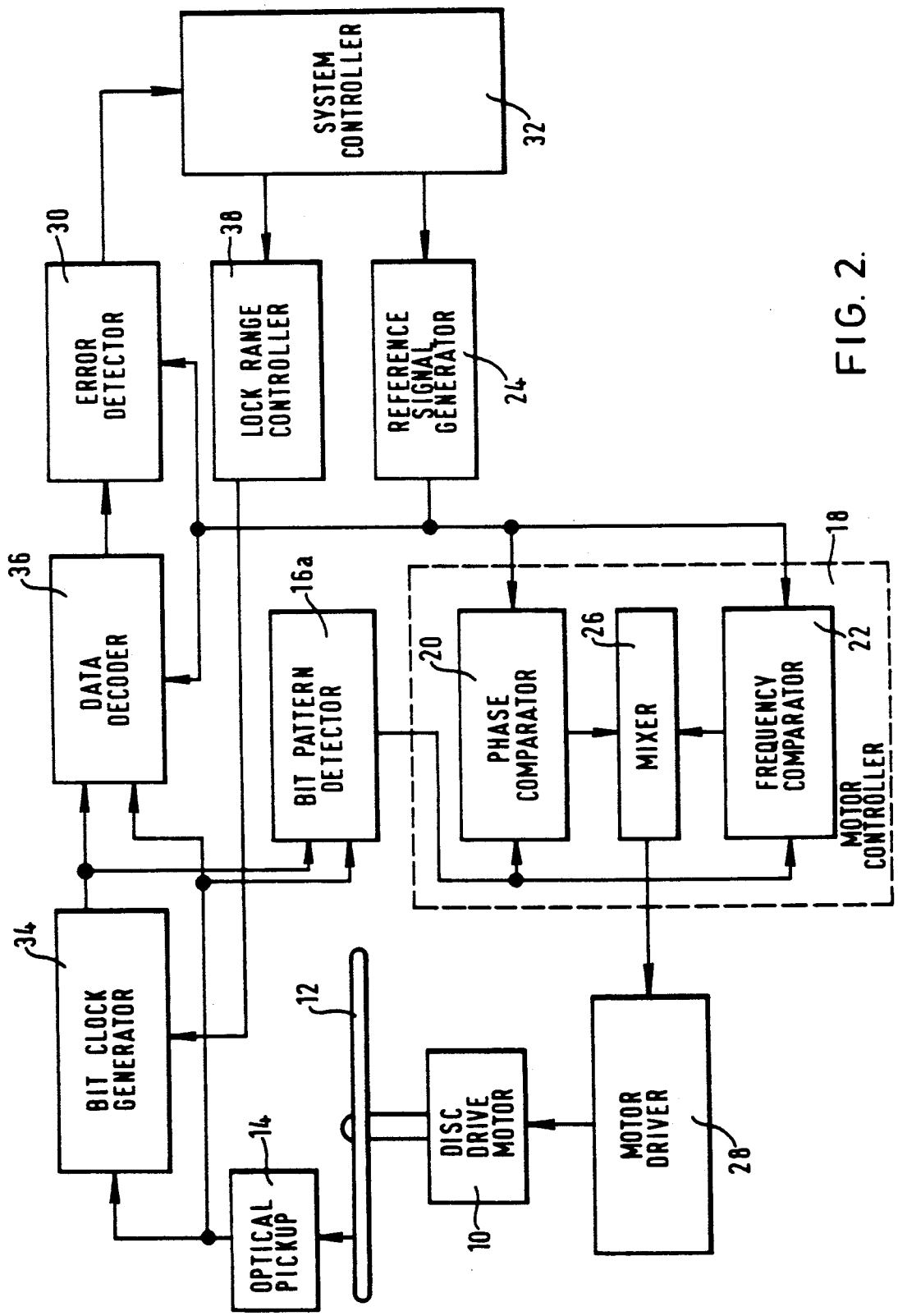
FIG. 2 is a block diagram showing a recorded data reader, which constitutes a second embodiment of the present invention.

FIG. 2 is a block diagram showing a second embodiment of the present invention. The second embodiment also consists of a CD-ROM reader.

The second embodiment, as shown in FIG. 2, differs from the first embodiment, as shown in FIG. 1, in the error detection system, however, the data reading speed control system in the two embodiments is the same. Therefore, only the different portion, i.e., the error detection system of the second embodiment, will be explained hereinafter. The common portion, i.e., the data reading speed control system, will be omitted from the following description.

The second embodiment, as shown in FIG. 2, is applicable to a system in which sync signals are not directly recorded on the record medium, while the first embodiment, as shown in FIG. 1, is generally applicable to a system in which sync signals are directly recorded on a recording medium together with data.

In the system in which sync signals are not directly recorded on the record medium, the sync signals are recorded through a modulation of data, such as an EFM (Eight-to-Fourteen Modulation) modulation. The sync signals present a specific bit pattern of the EFM data at a prescribed period. Thus, the sync signal is obtained by detecting the specific bit pattern of the EFM data.

In FIG. 2, an optical pickup 14 reads data, e.g., an EFM data from a CD-ROM 12. A bit clock generator 34 generates a bit clock by processing the EFM data from the optical pickup 14 in the manner of PLL (Phase Locked Loop) operation. A bit pattern detector 16 detects a specific bit pattern of the EFM data under the control of the bit clock supplied form the bit clock generator 34.

A data decoder 36 decodes the recorded data from the EFM data read by the optical pickup 14 under the control of the bit clock supplied from the bit clock generator 34. Thereafter, errors are detected by the error detector 30 in the same manner as in the first embodiment, shown in FIG. 1.

As the phase lock range of the bit clock generator 34 varies in response to variation of the data reading speed, a signal for changing the lock range is supplied from a lock range controller 38 to the bit clock generator 34. Further, the lock range control signal is controlled by the system controller 32 to follow the reference signal frequency.

The invention thus includes data readout means for reproducing data stored on the data storage medium, error detection means coupled to the data readout means for detecting an error rate at which errors occur in the data reproduced by the data readout means, readout control means for operating the data readout means at a selected data readout rate and system control means coupled to the error detection means and the readout control means for comparing the error rate to a predetermined system maximum error rate and for establishing the selected data readout rate such that the error rate is below the predetermined system maximum error rate. As embodied herein, the data readout means comprises the optical pickup 14. The error detection means comprises the error detector 30. The readout control means comprises the bit clock generator 34 and the bit pattern detector 16, the motor controller 18, the motor driver 28 and the disc drive motor 10. The system control means comprises the system controller 32 and the reference signal generator 24.

Figure 3:
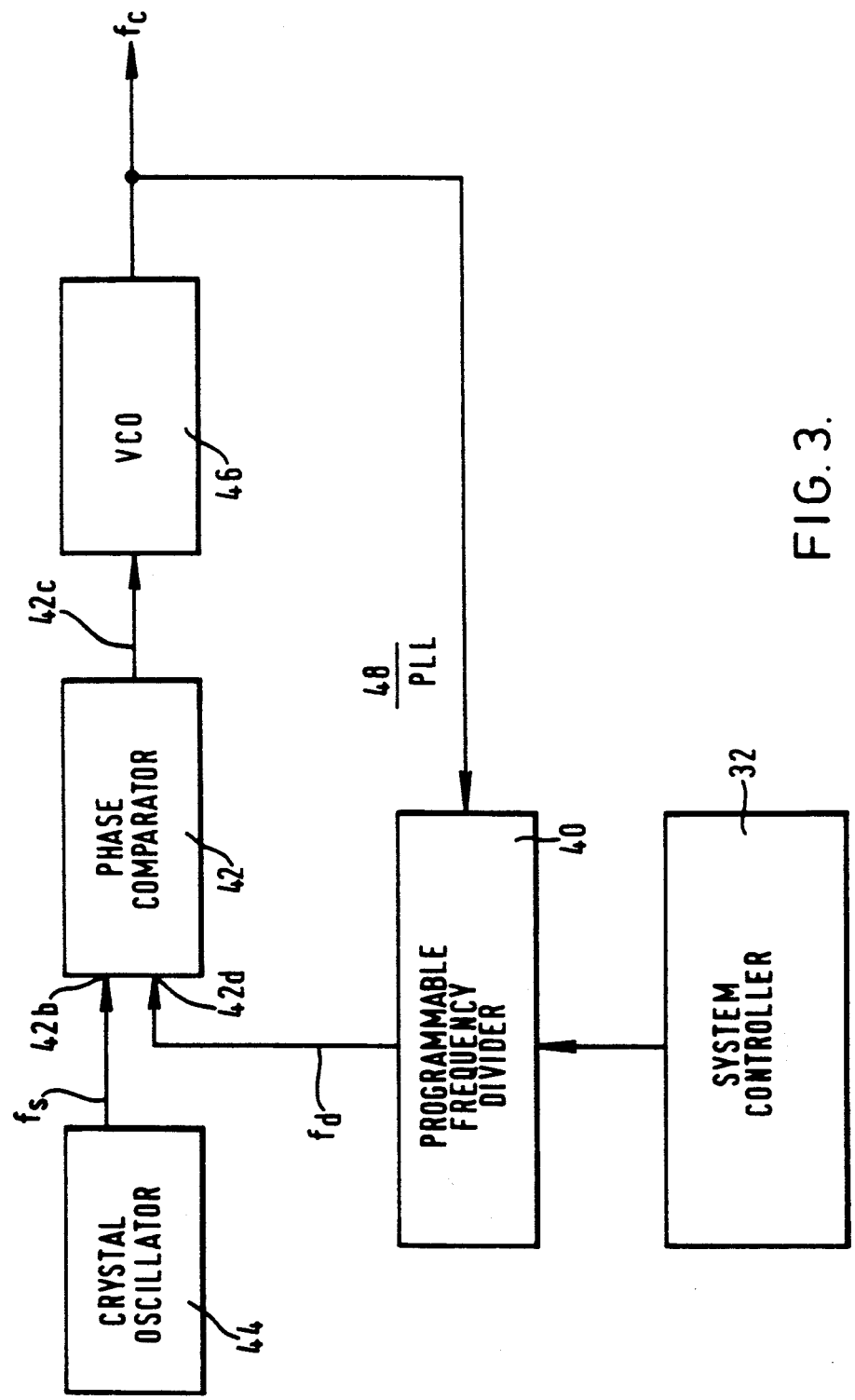
FIG. 3 is a detailed block diagram of a reference signal generator 24 shown in FIGS. 1 and 2.

FIG. 3 is a detailed block diagram of the reference signal generator 24, shown in FIGS. 1 and 2.

In FIG. 3, a frequency dividing ratio N that determines the frequency division ration 1/N for a programmable frequency divider 40 is set by the system controller 32. A divided frequency signal with a frequency fd which is output from the programmable frequency divider 40 is applied to the first input terminal 42d of a phase comparator 42. A reference signal with a frequency fs generated from a crystal oscillator 44 is applied to the second input terminal 42b of the phase comparator 42. Thus, the phase comparator 42 outputs a signal corresponding to the phase difference between the divided frequency signal and the reference signal. The phase difference signal output from the phase comparator 42 is applied to a VCO (Voltage Controlled Oscillator) 46 for controlling the frequency fc of a reference signal output from the VCO 46. This reference signal is supplied to the phase comparator 20 and the frequency comparator 22 (See FIGS. 1 and 2) in the motor controller 18. The reference signal also supplied to the programmable frequency divider 40. In the PLL 48 constituted by the programmable frequency divider 40, the phase comparator 42 and the VCO 46, the frequency fc of the reference signal is set up and stabilized by the system controller 32.

Assuming that, for instance, the frequency fs of the reference signal applied to the phase comparator 42 of the PLL 48 from the crystal oscillator 44 is 100 MHz and the frequency dividing ratio N is 100, the frequency fc of the reference signal will become 10 MHz.

Figure 4:
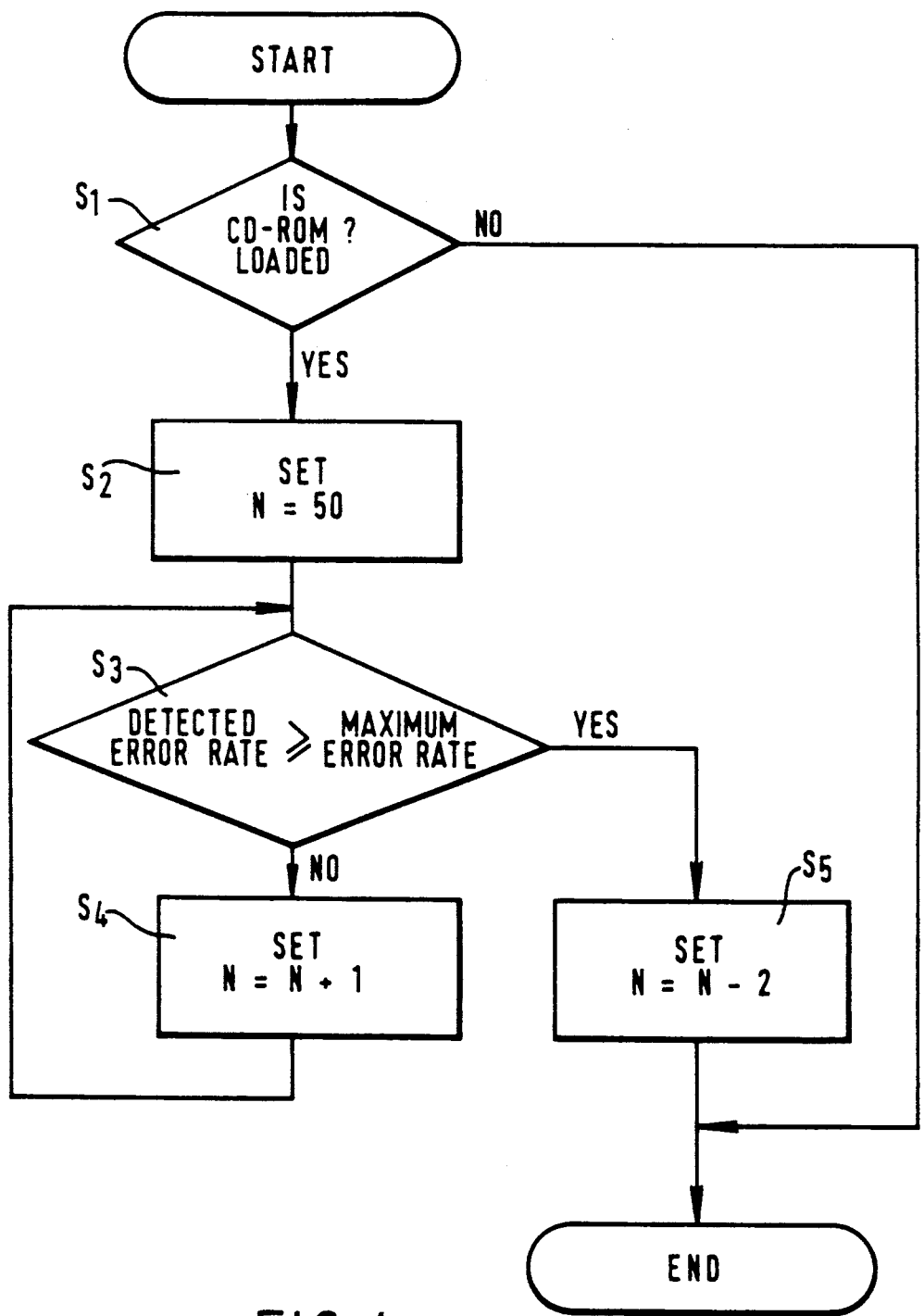
FIG. 4 is a flowchart showing the operation carried out by the recorded data reading system which constitutes a preferred embodiment of the present invention.

FIG. 4 is a flowchart showing the operation of the system of the present invention. The operation is carried out in the CD-ROM reader, as shown in FIGS. 1 and 2.

In FIG. 4, when the operation starts and advances from the step S1 to the step S2, it is judged whether a CD-ROM is loaded in the reader. If any CD-ROM is not loaded, the operation advances to the final step and the operation ends. If a CD-ROM is loaded in the reader, the operation advances to the next step S2.

In the step S2, the frequency dividing ratio N of the programmable frequency divider 40 is set at 50. As the result, the frequency fc of the reference signal is set at 5 MHz and the operation is then shifted to the step S3. In the step S3, the system controller 32 inputs an error rate detected by the error detector 30 and judges whether the detected error value is less than the maximum error rate.

If the detected error rate is less than the maximum error value, the operation advances to the step S4. In the step S4, the frequency dividing ratio N is increased by 1 (N = N+1). As the result, the data reading speed of the CD-ROM 12 is increased. Here, the operation is shifted back to the step S3 from the step S4. If it is judged that the detected error rate is equal to the maximum error rate or more as the result of the judgement in the step S3, the operation shifts to the step S5.

In the S5, the frequency dividing ratio N is reduced, for instance, by 2 (N = N−2). As the result, a data reading speed having a two level margin against a reading speed at which the errors corresponding to the maximum error rate are generated is set up. After the step S5, the operation shifts to the final step and the learning operation ends.

The recorded data reading system of the present invention is not limited to the embodiments shown, but is variable in various ways. Examples are described below.

a. According to a difference between a detected error rate and the maximum error rate, a reference signal of frequency having a fixed margin per operation is set up.

b. When no command for the data reading operation is given to a data processor, the learning operation is carried out at intervals of a fixed time.

c. If problems are detected in the data reading operation, the learning operation is commenced and a reading speed enabling the normal data reading is established.

Further, data record media to which the recorded data reading system of the present invention is applicable are not limited to disc type media such as CD-ROM, magnetic disc, etc., tape media such as magnetic tape, etc., and kinetic type record media to read recorded data by a relative motion between such reading elements as pickup, magnetic head, etc. Stationary type record media such as solid electronic memory, etc. may also use the present invention.

According to the present invention, the error rate in the data read in the individual system is determined and a data reading speed is established within a range in which the error rate of the read data does not exceed a fixed value.

Therefore, if the individual system has a high reading accuracy, it is possible to read data at a speed higher than a rated data reading speed so that an efficient data reading operation is assured. On the other hand, if the data reading accuracy of the system is lower than the rated data reading speed, the data reading speed is lowered to make sure the data reading operation is accurate.

The recorded data reading system to be provided by the present invention detects errors or an error rate of individual data read by a system, establishes a reading speed as fast as possible within a range where this detected error rate does not exceed a maximum error rate defined in the system, causes the system to perform the reading operation.

As described above, the present invention can provide an extremely preferable recorded data reading system.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. An apparatus for reading data stored on a data storage medium, comprising:

data readout means for reproducing data stored on the data storage medium;

error detection means, coupled to the data readout means, for detecting an error rate at which errors occur in the data reproduced by the data readout means;

readout control means for operating the data readout means at a selected data readout rate; and system control means, coupled to the error detection means and the readout control means, for comparing the error rate to a predetermined system maximum error rate and for increasing the selected data readout rate when the error rate is below the predetermined system maximum error rate.

2. Apparatus as recited in claim 1, wherein the system control means increases the selected readout rate such that the error rate is below the predetermined system maximum error rate by a fixed value.

3. Apparatus as recited in claim 1, comprising reference signal means, coupled to the system control means, for generating a reference signal establishing the selected data readout rate; and wherein the system control means controls the reference signal means to generate a reference signal establishing a higher selected data readout rate when the error rate is below the predetermined system maximum error rate.

4. Apparatus as recited in claim 3, wherein the data readout means reads the data by a mechanical movement between the data readout means and the data storage medium.

5. Apparatus as recited in claim 4, wherein the data stored in the data storage medium includes a data signal and a synchronous signal for the control of the relative movement between the data readout means and the data storage medium, and wherein the readout control means comprises first detection means for detecting the synchronous signal from the data reproduced by the data readout means.

6. Apparatus as recited in claim 5, comprising generating means for generating an error signal between the reference signal generated by the reference signal generating means and the synchronous signal detected by the first detection means.

7. Apparatus as recited in claim 6, the readout control means includes a drive means for the relative movement between the data readout means and the data storage medium so that the data readout means operates at the selected data readout rate.

8. Apparatus as recited in claim 7, wherein the data storage medium is a data storage disc, and wherein the drive means includes a drive motor for rotating the data storage disc.

9. Apparatus as recited in claim 4, wherein the data stored in the data storage medium has a predetermined bit pattern for the control of the mechanical movement between the data readout means and the data storage medium, and wherein the readout control means comprises second detection means for detecting the bit pattern of the data reproduced by the data readout means and for generating a bit pattern signal responsive to the bit pattern.

10. Apparatus as recited in claim 9, comprising generating means for generating an error signal between the reference signal generated by the reference signal means and the bit pattern signal detected by the second detection means.

11. Apparatus as recited in claim 10, the readout control means includes a drive means for the relative movement between the data readout means and the data storage medium so that the data readout means operates at the selected data readout rate.

12. Apparatus as recited in claim 11, wherein the data storage medium is a data storage disc, and wherein the drive means includes a drive motor for rotating the data storage disc.

13. A method for reproducing data stored on a data storage medium, comprising the steps of:
reading data from the data storage medium at a selected data readout rate;
determining an error rate of data read from the data storage medium;
comparing the error rate to a predetermined system maximum error rate;
increasing the selected data readout rate when the error rate is below the predetermined system maximum error rate.

14. A method for reproducing data stored on a data storage medium, comprising the steps of:
reading data from the data storage medium at a selected data readout rate;
determining an error rate of data read from the data storage medium;
comparing the error rate to a predetermined system maximum error rate;
decreasing the selected data readout rate when the error rate is above the system maximum error rate.

15. An apparatus for reading data stored on a data storage medium, comprising:
data readout means for reproducing data stored on the data storage medium;
error detection means, coupled to the data readout means, for detecting an error rate at which errors occur in the data reproduced by the data readout means;
readout control means for operating the data readout means at a selected data readout rate; and
system control means, coupled to the error detection means and the readout control means, for comparing the error rate to a predetermined system maximum error rate and for decreasing the selected data readout rate when the error rate is greater than the system maximum error rate.

16. Apparatus as recited in claim 15, wherein the system control means decreases the selected readout rate such that the error rate is below the predetermined system maximum error rate by a fixed value.

17. Apparatus as recited in claim 15, comprising reference signal means, coupled to the system control means, for generating a reference signal establishing the selected data readout rate; and wherein the system control means controls the reference signal means to generate a reference signal establishing a lower selected data readout rate when the error rate is above the predetermined system maximum error rate.

18. Apparatus as recited in claim 17, wherein the data readout means reads the data by a mechanical movement between the data readout means and the data storage medium.

19. Apparatus as recited in claim 18, wherein the data stored in the data storage medium includes a data signal and a synchronous signal for the control of the mechanical movement between the data readout means and the data storage medium, and wherein the readout control means comprises first detection means for detecting the synchronous signal from the data reproduced by the data readout means.

20. Apparatus as recited in claim 19, comprising generating means for generating an error signal between the reference signal generated by the reference signal means and the synchronous signal detected by the first detection means.

21. Apparatus as recited in claim 20, wherein the readout control means includes a drive means for the mechanical movement between the data readout means and the data storage medium so that the data readout means operates at the selected data readout rate.

22. Apparatus as recited in claim 21, wherein the data storage medium is a data storage disk, and wherein the drive means includes a drive motor for rotating the data storage disc.

23. Apparatus as recited in claim 18, wherein the data stored in the data storage medium has a predetermined bit pattern for the control of the mechanical movement between the data readout means and the data storage medium, and wherein the readout control means comprises second detection means for detecting the bit pattern of the data reproduced by the data readout means and for generating a bit pattern signal responsive to the bit pattern.

24. Apparatus as recited in claim 23, comprising generating means for generating an error signal between the reference signal generated by the reference signal means and the bit pattern signal detected by the second detection means.

* * * * *